(12) United States Patent
Kim

(10) Patent No.: US 10,862,078 B2
(45) Date of Patent: Dec. 8, 2020

(54) BATTERY MODULE FOR AN ELECTRIC VEHICLE

(71) Applicant: Ticona LLC, Florence, KY (US)

(72) Inventor: Young Shin Kim, Erlanger, KY (US)

(73) Assignee: Ticona LLC, Florence, KY (US)

( * ) Notice: Subject to any disclaimer, the term of this patent is extended or adjusted under 35 U.S.C. 154(b) by 134 days.

(21) Appl. No.: 15/874,993

(22) Filed: Jan. 19, 2018

(65) Prior Publication Data

US 2018/0212208 A1 Jul. 26, 2018

Related U.S. Application Data

(60) Provisional application No. 62/449,624, filed on Jan. 24, 2017.

(51) Int. Cl.
| | | |
|---|---|---|
| *H01M 2/02* | (2006.01) | |
| *H01M 10/052* | (2010.01) | |
| *C08L 81/04* | (2006.01) | |
| *H01M 10/625* | (2014.01) | |
| *H01M 10/653* | (2014.01) | |

(Continued)

(52) U.S. Cl.
CPC .......... *H01M 2/0257* (2013.01); *C08L 81/04* (2013.01); *H01M 2/1077* (2013.01); *H01M 10/052* (2013.01); *H01M 10/613* (2015.04); *H01M 10/625* (2015.04); *H01M 10/653* (2015.04); *H01M 10/655* (2015.04); *H01M 10/6554* (2015.04); *C08L 2201/08* (2013.01); *C08L 2203/20* (2013.01); *H01M 10/647* (2015.04); *H01M 2220/20* (2013.01); *Y02E 60/10* (2013.01); *Y02T 10/70* (2013.01)

(58) Field of Classification Search
CPC .......... H01M 2/0257; H01M 10/6554; H01M 10/613; H01M 10/655; H01M 2/1077; H01M 10/653; H01M 10/625; H01M 10/052; H01M 10/647; H01M 2220/20; C08L 81/04; C08L 2203/20; C08L 2201/08; Y02E 60/122; Y02T 10/7011
See application file for complete search history.

(56) References Cited

U.S. PATENT DOCUMENTS

| | | |
|---|---|---|
| 7,294,431 B2 | 11/2007 | Puttaiah et al. |
| 8,796,392 B2 | 8/2014 | Luo et al. |

(Continued)

FOREIGN PATENT DOCUMENTS

WO   WO 2016/121894 A1   8/2016

OTHER PUBLICATIONS

ASTM E1461-11—Thermal Diffusivity by the Flash Method, ASTM International, Sep. 10, 2013, 2 pages.

(Continued)

*Primary Examiner* — Lisa S Park
(74) *Attorney, Agent, or Firm* — Dority & Manning, P.A.

(57) ABSTRACT

A polymer composition that can be employed in a battery module for a vehicle is disclosed. The polymer composition comprises a polyarylene sulfide, a thermally conductive particulate material, an inorganic particulate material, and a fibrous filler. The polymer composition exhibits a Charpy notched impact strength of about 3 kJ/m$^2$ or more as measured at a temperature of 23° C. according to ISO Test No. 179-1:2010 and an in-plane thermal conductivity of about 0.7 W/m–K or more as determined in accordance with ASTM E 1461-13.

29 Claims, 2 Drawing Sheets

(51) Int. Cl.
*H01M 2/10* (2006.01)
*H01M 10/655* (2014.01)
*H01M 10/613* (2014.01)
*H01M 10/6554* (2014.01)
*H01M 10/647* (2014.01)

(56) References Cited

U.S. PATENT DOCUMENTS

| | | |
|---|---|---|
| 8,835,033 B2 | 9/2014 | Choi et al. |
| 8,951,656 B2 | 2/2015 | Bender et al. |
| 9,080,036 B2 | 7/2015 | Luo et al. |
| 9,119,307 B2 | 8/2015 | Luo et al. |
| 9,127,142 B2 | 9/2015 | Luo et al. |
| 9,209,483 B2 | 12/2015 | Fuhr et al. |
| 9,365,718 B2 | 6/2016 | Luo et al. |
| 9,450,275 B2 | 9/2016 | Obasih et al. |
| 9,590,279 B2 | 3/2017 | Obasih et al. |
| 9,909,006 B2 | 3/2018 | Ramalingam et al. |
| 10,223,304 B2 | 3/2019 | Takahashi et al. |
| 10,280,304 B2 | 5/2019 | Tomoda |
| 2010/0159317 A1 | 6/2010 | Taghikhani et al. |
| 2012/0175548 A1* | 7/2012 | Shin ............... C08L 77/06 252/75 |
| 2012/0217434 A1* | 8/2012 | l'Abee et al. ......... C08K 3/013 252/74 |
| 2013/0012642 A1* | 1/2013 | Mecklenburg .......... C08L 23/10 524/451 |
| 2013/0273281 A1 | 10/2013 | Luo et al. |
| 2014/0186669 A1* | 7/2014 | Obasih ................ H01M 2/0262 429/71 |
| 2015/0184055 A1* | 7/2015 | Raman ..................... C09K 5/14 252/75 |
| 2015/0225547 A1 | 8/2015 | Tu et al. |
| 2015/0225567 A1 | 8/2015 | Miller et al. |
| 2018/0037790 A1 | 2/2018 | Kim |
| 2018/0223054 A1* | 8/2018 | Okunaka ................. C08K 3/04 |
| 2018/0265701 A1 | 9/2018 | Tomoda et al. |

OTHER PUBLICATIONS

ISO 179-1:2010—Plastics—Determination of Charpy Impact Properties—Part 1: Non-instrumented Impact Test, International Organization for Standardization, 2015, 3 pages.

Mraz, Stephen, "Mineral Fillers Improve Plastics," *Machine Design*, Oct. 1, 2015, 12 pages.

Sherman, Lilli Manolis, "Plastics That Conduct Heat," *Plastics Technology*, Jun. 1, 2001, 7 pages.

International Search Report and Written Opinion for PCT/US2018/014391 dated May 10, 2018, 9 pages.

* cited by examiner

BATTERY MODULE FOR AN ELECTRIC VEHICLE

RELATED APPLICATIONS

The present application claims priority to U.S. Provisional Application Ser. No. 62/449,624, filed on Jan. 24, 2017, which is incorporated herein in its entirety by reference thereto.

BACKGROUND OF THE INVENTION

Electric vehicles that employ electric power for all or a portion of their motive power (e.g., electric vehicles, hybrid electric vehicles, and plug-in hybrid electric vehicles) can provide a number of advantages to more traditional gas-powered vehicles. For example, electric vehicles may produce fewer undesirable emission products and may exhibit greater fuel efficiency as compared to vehicles using internal combustion engines. As electric vehicle technology continues to evolve, there is a need to provide improved battery systems for such vehicles to increase the distance that such vehicles may travel without the need to recharge. In this regard, manufacturers have begun to develop lithium-ion batteries that have a high charge density and can thus store a high level of charge. Unfortunately, lithium-ion batteries also tend to be sensitive to temperature and can thus experience failure when excessively high temperatures are reached. For this reason, conductive metals are often employed in the housing of lithium-ion battery modules to help conduct heat away from the batteries during operation. While somewhat effective, these metals are expensive and can be relatively heavy, which reduces the power efficiency of the vehicle. While thermally conductive polymers exist that accomplish a similar function, these compositions tend to be formed from polymers that are also heat sensitive, or the compositions lack the requisite degree of strength to meet the stringent requirements of most automotive applications.

As such, a need currently exists for an improved battery module and for thermally conductive polymer compositions that can be used in such applications.

SUMMARY OF THE INVENTION

In accordance with one embodiment of the present invention, a polymer composition for use in a battery module of a vehicle is disclosed. The polymer composition comprises a polyarylene sulfide, a thermally conductive particulate material, an inorganic particulate material, and a fibrous filler. The composition exhibits a Charpy notched impact strength of about 3 kJ/m$^2$ or more as measured at a temperature of 23° C. according to ISO Test No. 179-1:2010 and an in-plane thermal conductivity of about 0.7 W/m–K or more as determined in accordance with ASTM E 1461-13. In certain embodiments, the battery module may contain at least one electrochemical cell, such as a lithium-ion battery, positioned within a housing. If desired, the housing (e.g., external walls, interior wall, cover, etc.) may contain the polymer composition. The housing may be connected to a frame, which can also contain the polymer composition.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
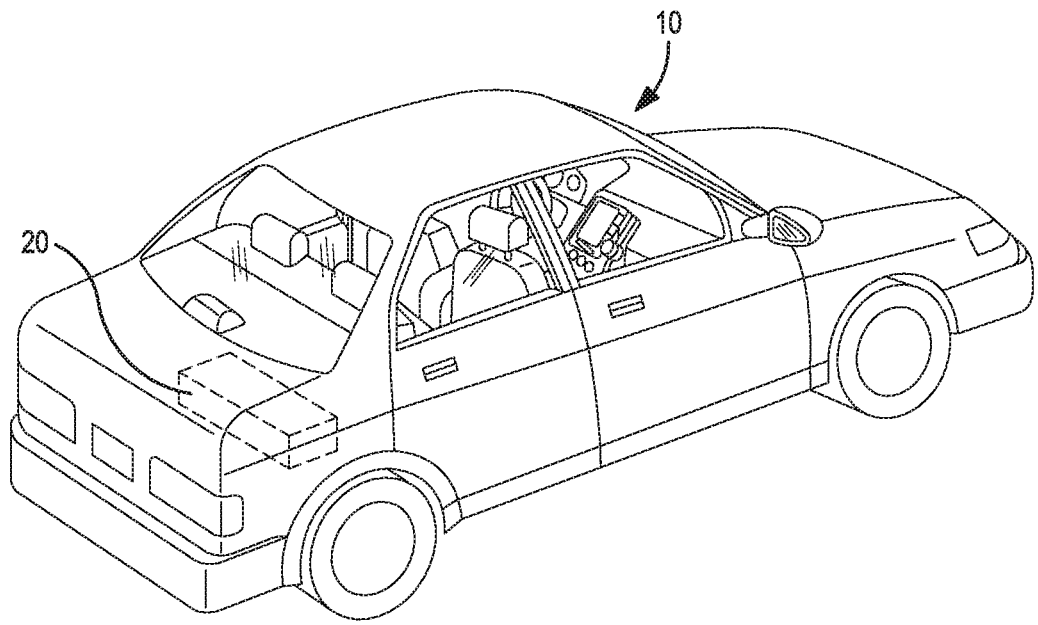
FIG. 1 is a perspective view of one embodiment a vehicle that may employ the battery module of the present invention.

It is to be understood by one of ordinary skill in the art that the present discussion is a description of exemplary embodiments only, and is not intended as limiting the broader aspects of the present invention.

Generally speaking, the present invention is directed to a battery module for use in an electric vehicle that includes one or more electrochemical cells (e.g., lithium-ion cells, nickel-metal-hydride cells, lithium polymer cells, etc.). Notably, at least a portion of the module contains a thermally conductive polymer composition. By selectively controlling the components used in the composition along with their relative concentration, the present inventors have discovered that the composition can exhibit a unique combination of thermal conductivity, impact strength (e.g., Charpy notched impact strength) and mechanical properties (e.g., tensile modulus and flexural modulus) that enables it to be readily employed in battery modules for electric vehicles. For example, the polymer composition may exhibit a Charpy notched impact strength of about 3 kJ/m$^2$ or more, in some embodiments about 4 kJ/m$^2$ or more, in some embodiments about 5 kJ/m$^2$ or more, in some embodiments from about 6 to about 30 kJ/m$^2$, and in some embodiments, from about 6 to about 25 kJ/m$^2$, measured at 23° C. according to ISO Test No. 179-1:2010) (technically equivalent to ASTM D256-10, Method B). The composition may also exhibit a tensile strength of about 40 Megapascals ("MPa") or more, in some embodiments about 50 MPa or more, in some embodiments from about 55 to about 200 MPa, and in some embodiments, from about 60 to about 150 MPa, as well as a tensile modulus of about 15,000 MPa or more, in some embodiments about 16,000 MPa or more, in some embodiments from about 17,000 to about 50,000 MPa, and in some embodiments, from about 18,000 to about 25,000 MPa, wherein the tensile properties are determined in accordance with ISO Test No. 527:2012 (technically equivalent to ASTM D638-14) at 23° C. The composition may also exhibit a flexural strength of from about 70 to about 500 MPa, in some embodiments from about 80 to about 400 MPa, and in some embodiments, from about 90 to about 300 MPa and/or a flexural modulus of from about 15,000 MPa to about 30,000 MPa, in some embodiments from about 18,000 MPa to about 25,000 MPa, and in some embodiments, from about 19,000 MPa to about 24,000 MPa. The flexural properties may be determined in accordance with ISO Test No. 178:2010 (technically equivalent to ASTM D790-10) at 23° C.

Contrary to conventional wisdom, it is has been discovered that such a balance in high impact strength and tensile/flexural properties can be achieved without adversely impacting thermal conductivity. In this manner, the composition is capable of creating a thermal pathway for heat transfer away from the battery module so that "hot spots"

can be quickly eliminated and the overall temperature of the module can be lowered during use. More particularly, the composition has an in-plane thermal conductivity of about 0.7 W/m-K or more, in some embodiments about 0.8 W/m-K or more, about 1 W/m-K or more, and in some embodiments, from about 1.5 to about 10 W/m-K, as determined in accordance with ASTM E 1461-13.

The present inventors have discovered that the ability to achieve a polymer composition with such a unique combination of properties can be achieved through selective control over the nature of the components employed in the composition, and their relative concentration. For example, the composition may employ a polyarylene sulfide in combination with a thermally conductive particulate material, inorganic particulate filler, and a fibrous filler. The thermally conductive particulate material is typically employed in an amount of from about 5 to about 50 parts, in some embodiments from about 8 parts to about 40 parts, and in some embodiments, from about 10 to about 35 parts by weight per 100 parts by weight of polyarylene sulfide(s) employed in the composition. The inorganic particulate filler may likewise be employed in an amount of from about 30 to about 70 parts, in some embodiments from about 35 to about 60 parts, and in some embodiments, from about 40 to about 55 parts by weight per 100 parts by weight of polyarylene sulfide(s) employed in the composition, while the fibrous filler may be employed in an amount of from about 50 to about 180 parts, in some embodiments from about 80 to about 160 parts, and in some embodiments, from about 90 to about 150 parts by weight per 100 parts by weight of polyarylene sulfide(s) employed in the composition. For example, the thermally conductive particulate material typically constitutes from about 1 wt. % to about 20 wt. %, in some embodiments from about 2 wt. % to about 15 wt. %, and in some embodiments, from about 3 wt. % to about 10 wt. % of the polymer composition, the inorganic particulate material typically constitutes from about 1 wt. % to about 30 wt. %, in some embodiments from about 5 wt. % to about 25 wt. %, and in some embodiments, from about 10 wt. % to about 20 wt. % of the polymer composition, and the fibrous filler typically constitutes from about 25 wt. % to about 70 wt. %, in some embodiments from about 30 wt. % to about 65 wt. %, and in some embodiments, from about 40 wt. % to about 60 wt. % of the polymer composition. Polyarylene sulfides also typically constitute from about 15 wt. % to about 60 wt. %, in some embodiments from about 20 wt. % to about 55 wt. %, and in some embodiments, from about 25 wt. % to about 50 wt. % of the polymer composition.

Various embodiments of the present invention will now be described in more detail.

I. Polymer Composition

A. Polyarylene Sulfide

The polyarylene sulfide(s) employed in the polymer composition generally have repeating units of the formula:

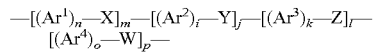

wherein, $Ar^1$, $Ar^2$, $Ar^3$, and $Ar^4$ are independently arylene units of 6 to 18 carbon atoms;

W, X, Y, and Z are independently bivalent linking groups selected from $—SO_2—$, $—S—$, $—SO—$, $—CO—$, $—O—$, $—C(O)O—$ or alkylene or alkylidene groups of 1 to 6 carbon atoms, wherein at least one of the linking groups is $—S—$; and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure $—(C_6H_4—S)_n—$ (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

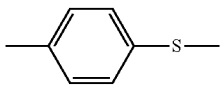

and segments having the structure of formula:

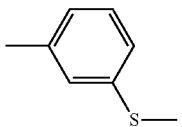

or segments having the structure of formula:

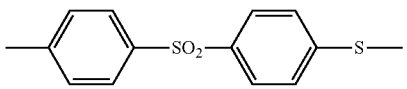

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

Although not necessarily required, linear polyarylene sulfides may be particularly suitable due to their relatively high degree of crystallinity, which can improve impact strength. For example, linear polyarylene sulfides may constitute about 50 wt. % or more, in some embodiments about 70 wt. % or more, and in some embodiments from about 80 wt. % to 100 wt. % (e.g., 100 wt. %) of polyarylene sulfides employed in the polymer composition.

B. Thermally Conductive Particulate Material

The thermally conductive particulate material employed in the polymer composition may have a high specific surface area. The specific surface area may be, for example, about 0.5 m$^2$/g or more, in some embodiments about 1 m$^2$/g or more, and in some embodiments, from about 2 to about 40 m$^2$/g. The specific surface area can be determined according to standard methods such as by the physical gas adsorption method (B.E.T. method) with nitrogen as the adsorption gas, as is generally known in the art and described by Brunauer, Emmet, and Teller (J. Amer. Chem. Soc., vol. 60, February, 1938, pp. 309-319). The particulate material may also have a powder tap density of from about 0.2 to about 1.0 g/cm$^3$, in some embodiments from about 0.3 to about 0.9 g/cm$^3$, and in some embodiments, from about 0.4 to about 0.8 g/cm$^3$, such as determined in accordance with ASTM B527-15.

The thermally conductive particulate material may also have a high intrinsic thermal conductivity, such as about 50 W/m–K or more, in some embodiments about 100 W/m–K or more, and in some embodiments, about 150 W/m–K or more. Examples of such materials may include, for instance, boron nitride (BN), aluminum nitride (AlN), magnesium silicon nitride (MgSiN$_2$), graphite (e.g., expanded graphite), silicon carbide (SiC), carbon nanotubes, carbon black, metal oxides (e.g., zinc oxide, magnesium oxide, beryllium oxide, zirconium oxide, yttrium oxide, etc.), metallic powders (e.g., aluminum, copper, bronze, brass, etc.), etc., as well as combinations thereof. Graphite is particularly suitable for use in the composition of the present invention. In fact, in certain embodiments, graphite may constitute a majority of the thermally conductive particulate material employed in the polymer composition, such as about 50 wt. % or more, in some embodiments, about 70 wt. % or more, and in some embodiments, from about 90 wt. % to 100 wt. % (e.g., 100 wt. %) of the thermally conductive particulate material.

The thermally conductive particulate material typically has an average size (e.g., diameter or length) in the range of about 1 to about 100 micrometers, in some embodiments from about 2 to about 80 micrometers, and in some embodiments, from about 5 to about 60 micrometers, such as determined using laser diffraction techniques in accordance with ISO 13320:2009 (e.g., with a Horiba LA-960 particle size distribution analyzer). In certain embodiments, the particulate material may have a "flake" shape in that it has a relatively high aspect ratio (e.g., average length or diameter divided by average thickness), such as about 4:1 or more, in some embodiments about 8:1 or more, and in some embodiments, from about 10:1 to about 2000:1. The average thickness may, for instance, be about 10 micrometers or less, in some embodiments from about 0.01 micrometers to about 8 micrometers, and in some embodiments, from about 0.05 micrometers to about 5 micrometers.

C. Inorganic Particulate Filler

As indicated, inorganic particulate fillers are also employed in the polymer composition. Various types of inorganic particulate fillers may be employed as is known in the art. Clay minerals, for instance, may be particularly suitable for use in the present invention. Examples of such clay minerals include, for instance, talc (Mg$_3$Si$_4$O$_{10}$(OH)$_2$), halloysite (Al$_2$Si$_2$O$_5$(OH)$_4$), kaolinite (Al$_2$Si$_2$O$_5$(OH)$_4$), illite ((K,H$_3$O)(Al,Mg,Fe)$_2$ (Si,Al)$_4$O$_{10}$[(OH)$_2$,(H$_2$O)]), montmorillonite (Na,Ca)$_{0.33}$(Al,Mg)$_2$Si$_4$O$_{10}$(OH)$_2$.nH$_2$O), vermiculite ((MgFe,Al)$_3$(Al,Si)$_4$O$_{10}$(OH)$_2$.4H$_2$O), palygorskite ((Mg,Al)$_2$Si$_4$O$_{10}$(OH).4(H$_2$O)), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. The inorganic particulate filler typically contains particles having an average size (e.g., diameter or length) in the range of about 1 to about 100 micrometers, in some embodiments from about 2 to about 80 micrometers, and in some embodiments, from about 5 to about 60 micrometers, such as determined using laser diffraction techniques in accordance with ISO 13320:2009 (e.g., with a Horiba LA-960 particle size distribution analyzer). In certain embodiments, the particles may have a generally spherical shape in that they have an aspect ratio (e.g., average length or diameter divided by average thickness) near 1, such as from about 0.6 to about 2.0, in some embodiments from about 0.7 to about 1.5, and in some embodiments, from about 0.8 to about 1.2. Due to their inherent flexibility in comparison to high aspect ratio materials, the use of generally spherical particles can help further improve the overall toughness and impact strength of the composition. In certain embodiments, generally spherical calcium carbonate particles may be particularly suitable for use in the present invention.

D. Fibrous Filler

The fibrous filler generally contains fibers a high degree of tensile strength relative to their mass. For example, the ultimate tensile strength of the fibers (determined in accordance with ASTM D2101) is typically from about 1,000 to about 15,000 MPa, in some embodiments from about 2,000 MPa to about 10,000 MPa, and in some embodiments, from about 3,000 MPa to about 6,000 MPa. The high strength fibers may be formed from materials that are also electrically insulative in nature, such as glass, ceramics (e.g., alumina or silica), etc., as well as mixtures thereof. Glass fibers are particularly suitable, such as E-glass, A-glass, C-glass, D-glass, AR-glass, R-glass, S1-glass, S2-glass, etc., and mixtures thereof.

The fibers may also have a relatively high length, which is believed to further enhance thermal conductivity. For example, the fibers may have a volume average length of from about 1 to about 400 micrometers, in some embodiments from about 80 to about 250 micrometers, in some embodiments from about 100 to about 200 micrometers, and in some embodiments, from about 110 to about 180 micrometers. The fibers may also have a narrow length distribution. That is, at least about 70% by volume of the fibers, in some embodiments at least about 80% by volume of the fibers, and in some embodiments, at least about 90% by volume of the fibers have a length within the range of from about 1 to about 400 micrometers, in some embodiments from about 80 to about 250 micrometers, in some embodiments from about 100 to about 200 micrometers, and in some embodiments, from about 110 to about 180 micrometers. In addition to possessing the length characteristics noted above, the fibers may also have a relatively high aspect ratio (average length divided by nominal diameter) to help improve the mechanical properties of the resulting polymer composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 5 to about 35 micrometers, and in some embodiments, from about 8 to about 30 micrometers.

D. Other Components

A wide variety of additional additives can also be included in the polymer composition, such as organosilane compounds, lubricants, pigments, antioxidants, UV stabilizers, surfactants, waxes, flame retardants, anti-drip additives, additional polymers, and other materials added to enhance properties and processability. In certain embodiments, for instance, the polymer composition may contain an organosilane compound to help improve the compatibility between the polyarylene sulfide and the filler components (e.g., fibrous filler). When employed, such organosilane compounds typically constitute from about 0.01 wt. % to about 3 wt. %, in some embodiments from about 0.02 wt. % to about 1 wt. %, and in some embodiments, from about 0.05 to about 0.5 wt. % of the polymer composition. The organosilane compound may, for example, be any alkoxysilane as is known in the art, such as vinlyalkoxysilanes, epoxyalkoxysilanes, aminoalkoxysilanes, mercaptoalkoxysilanes, and combinations thereof. In one embodiment, for instance, the organosilane compound may have the following general formula:

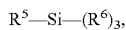

wherein, $R^5$ is a sulfide group (e.g., —SH), an alkyl sulfide containing from 1 to 10 carbon atoms (e.g., mercaptopropyl, mercaptoethyl, mercaptobutyl, etc.), alkenyl sulfide containing from 2 to 10 carbon atoms, alkynyl sulfide containing from 2 to 10 carbon atoms, amino group (e.g., $NH_2$), aminoalkyl containing from 1 to 10 carbon atoms (e.g., aminomethyl, aminoethyl, aminopropyl, aminobutyl, etc.); aminoalkenyl containing from 2 to 10 carbon atoms, aminoalkynyl containing from 2 to 10 carbon atoms, and so forth;

$R^6$ is an alkoxy group of from 1 to 10 carbon atoms, such as methoxy, ethoxy, propoxy, and so forth.

Some representative examples of organosilane compounds that may be included in the mixture include mercaptopropyl trimethyoxysilane, mercaptopropyl triethoxysilane, aminopropyl triethoxysilane, aminoethyl triethoxysilane, aminopropyl trimethoxysilane, aminoethyl trimethoxysilane, ethylene trimethoxysilane, ethylene triethoxysilane, ethyne trimethoxysilane, ethyne triethoxysilane, aminoethylaminopropyltrimethoxysilane, 3-aminopropyl triethoxysilane, 3-aminopropyl trimethoxysilane, 3-aminopropyl methyl dimethoxysilane or 3-aminopropyl methyl diethoxysilane, N-(2-aminoethyl)-3-aminopropyl trimethoxysilane, N-methyl-3-aminopropyl trimethoxysilane, N-phenyl-3-aminopropyl trimethoxysilane, bis(3-aminopropyl) tetramethoxysilane, bis(3-aminopropyl) tetraethoxy disiloxane, γ-aminopropyltrimethoxysilane, γ-aminopropyltriethoxysilane, γ-aminopropylmethyldimethoxysilane, γ-aminopropylmethyldiethoxysilane, N-(p-aminoethyl)-γ-aminopropyltrimethoxysilane, N-phenyl-γ-aminopropyltrimethoxysilane, γ-diallylaminopropyltrimethoxysilane, γ-diallylaminopropyltrimethoxysilane, etc., as well as combinations thereof. Particularly suitable organosilane compounds are 3-aminopropyltriethoxysilane and 3-mercaptopropyltrimethoxysilane.

If desired, other polymers may also be employed in combination with the polyarylene sulfide. For example, suitable polymers for use in the composition may include polyamides (e.g., nylon-6, nylon-66, etc.), polyesters (e.g., polybutylene terephthalate, polyethylene terephthalate, etc.), polyolefins, liquid crystalline polymers, polyaryletherketones (e.g., polyetheretherketone), polycarbonates, polyphenylene oxides, and so forth.

Regardless of the particular components employed, the polyarylene sulfide, thermally conductive particulate material, inorganic particulate filler, fibrous filler, and other optional additives may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. It is typically desired to minimize the number of distributive and/or dispersive mixing elements that are employed within the mixing and/or melting sections of the extruder. In this manner, the extent to which the length of the fibers is degraded during extrusion can be minimized, which enhances thermal conductivity as noted above. The fibers may be added a location downstream from the point at which the polyarylene sulfide is supplied (e.g., hopper). The fibers may also be supplied to the extruder at a location downstream from the polyarylene sulfide to further minimize fiber degradation. The thermally conductive particulate material and inorganic particulate filler are also typically added to the extruder a location downstream from the point at which the polyarylene sulfide is supplied. One or more of the sections of the extruder are typically heated, such as within a temperature range of from about 200° C. to about 450° C., in some embodiments, from about 220° C. to about 350° C., and in some embodiments, from about 250° C. to about 350° C. to form the composition. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4 Q/\pi R^3$, where Q is the volumetric flow rate ("m$^3$/s") of the polymer melt and R is the radius ("m") of the capillary (e.g., extruder die) through which the melted polymer flows.

The crystallization temperature of the resulting polymer composition may about 250° C. or less, in some embodiments from about 100° C. to about 245° C., and in some embodiments, from about 150° C. to about 240° C. The melting temperature of the polymer composition may also range from about 250° C. to about 320° C., and in some embodiments, from about 260° C. to about 300° C. The melting and crystallization temperatures may be determined as is well known in the art using differential scanning calorimetry in accordance with ISO Test No. 11357:2007. Even at such melting temperatures, the ratio of the deflection temperature under load ("DTUL"), a measure of short term heat resistance, to the melting temperature may still remain relatively high. For example, the ratio may range from about 0.65 to about 1.00, in some embodiments from about 0.70 to about 0.99, and in some embodiments, from about 0.80 to about 0.98. The specific DTUL values may, for instance, range from about 250° C. to about 340° C., in some embodiments from about 260° C. to about 330° C., and in some embodiments, from about 270° C. to about 320° C. Such high DTUL values can, among other things, allow the use of high speed processes often employed during the manufacture of components having a small dimensional tolerance.

II. Battery Module

As noted above, the polymer composition of the present invention may be employed in a battery module to help remove, conduct, and/or absorb heat. The battery module is generally responsible for packaging or containing electrochemical cells (e.g., batteries), connecting the electrochemical cell elements to each other and/or to other components of the vehicle electrical system, and regulating the electrochemical cell elements and other features of the system. The thermally conductive polymer composition may be employed as a stand-alone component of the battery module (e.g., as a heat sink) or it may also serve some other function of the module, such as in the housing for one or more electrochemical cells or a frame to which such a housing is connected. Regardless, the component may be formed using a variety of different processes, such as by molding (e.g., injection molding, compression molding, etc.), casting, thermoforming, etc. For example, the component may be molded using a one-component injection molding process in which granules formed from the polymer composition are injected into a mold, shaped, and thereafter cooled. The design and shape of the resulting component may vary as is known in the art and can depend upon a variety of different factors, such as the specific application, the degree of heat transfer needed, the location of the component, and the amount of available space.

Typically, the battery module includes one more electrochemical cells (e.g., lithium ion cells, nickel-metal-hydride cells, lithium polymer cells, etc.) positioned within a housing. For instance, the module may employ two or more, in some embodiments, three or more, and in some embodiments, from four to twenty cells. If desired, each individual cell may also be individually packaged within a case. Further, the module housing may be connected to a frame or cover that helps protect and stabilize the cell(s) during use. The thermally conductive polymer composition may be employed to form all or a portion of any component of the module, such as the case of an individual cell, the module housing, the frame, etc.

Figure 3:
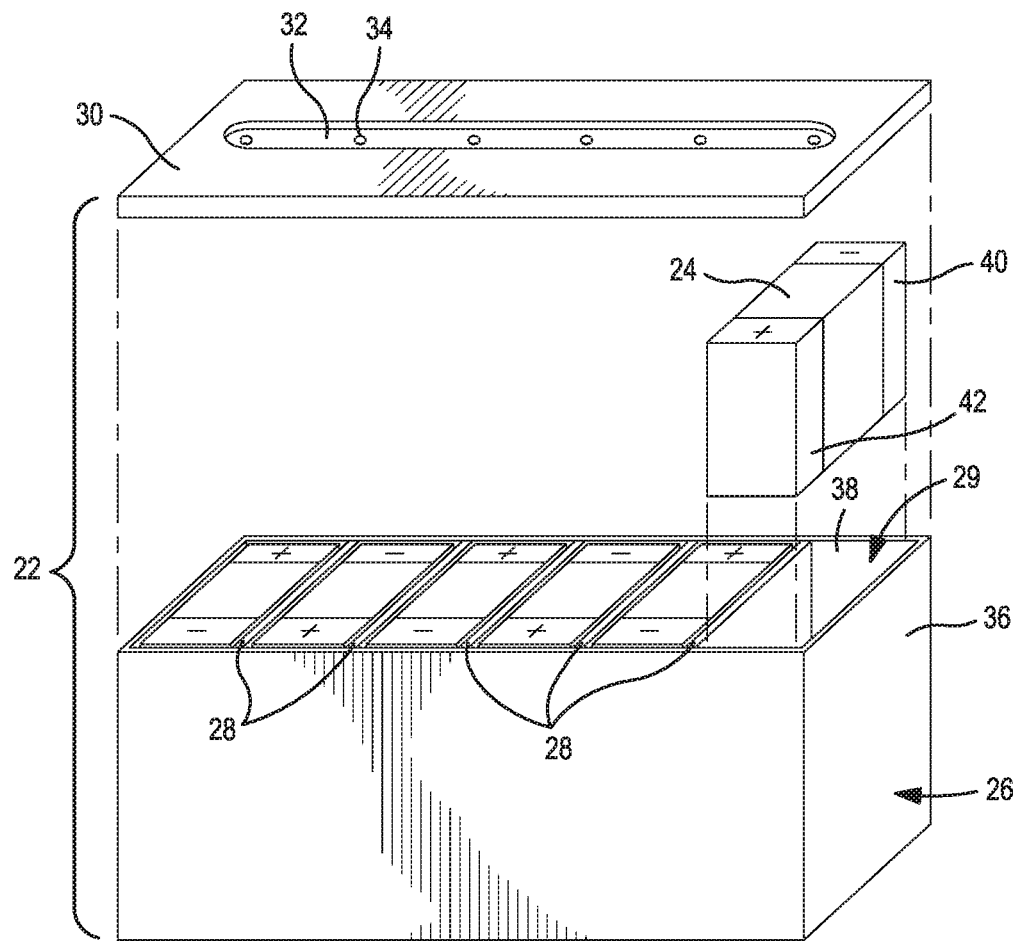
FIG. 3 is a partial exploded view of one embodiment of a battery module that may be employed in the present invention.

Referring to FIG. 3, for example, one particular embodiment of a battery module 22 (e.g., battery pack) is shown. The battery module 22 includes a plurality of electrochemical cells 24 configured to store an electrical charge. The shape of the cells may vary as desired, such as prismatic, oval, cylindrical, polygonal, etc. The cells 24 typically include a plurality of negative electrodes 40, positive electrodes 42, and separators alternatingly stacked together. The cells 24 may be electrically coupled to each other or other components of the battery module using connectors, such bus bars. The battery module 22 also includes a housing 26, which may contain external walls 36 that define a compartment 29 for receiving one or more electrochemical cells 24. If desired, the housing 36 may also include or more interior walls 28 to help further isolate individual electrochemical cells 24 from each other. The housing 26 may also contain a cover 30 to close the compartment 29, which may optionally include a channel 32 that is in fluid communication with a plurality of openings 34 for providing an electrolyte into the compartment 29. Once supplied within the housing, the openings 34 may be sealed such that the electrolyte is retained within the compartments 29.

As indicated above, the thermally conductive polymer composition of the present invention may be employed to form one or more components of the housing 36, such as the external walls 36, interior walls 28, and/or cover 30. In the illustrated embodiment, for instance, the composition is employed to form the external walls 38. Although not specifically shown, it should be understood that the battery module may also contain other components as is known in the art. For example, the battery module may contain a frame that is connected to the housing using known techniques, such as by over molding, etc. The frame may be employed to help attach the module to the vehicle structure and may be formed from the thermally conductive polymer composition, or from conventional materials (e.g., metals, such as aluminum).

Figure 2:
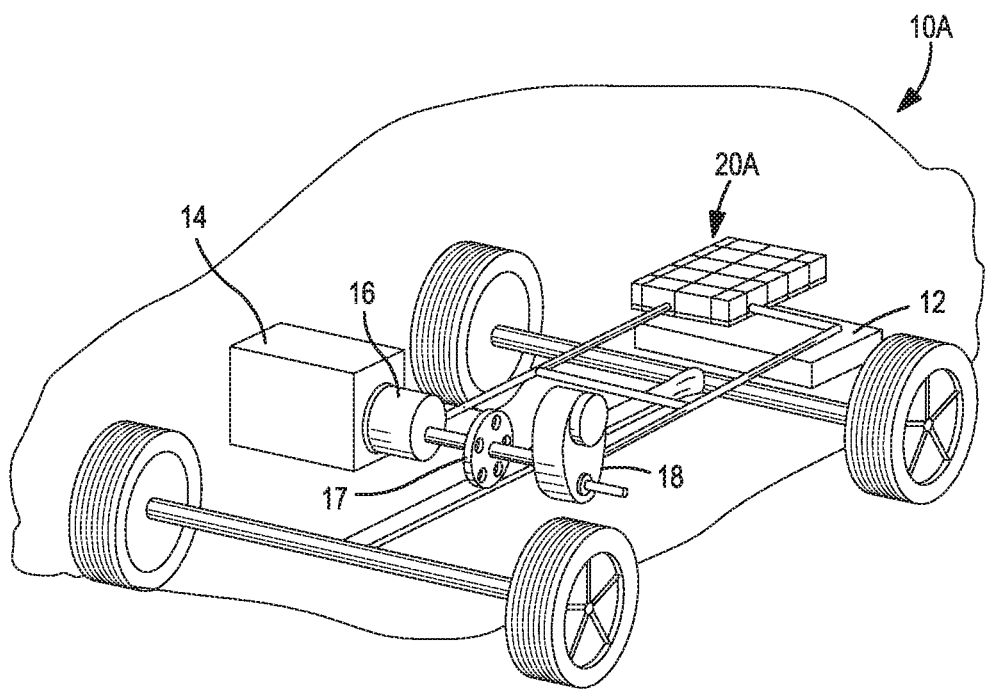
FIG. 2 is a schematic cutaway view of one embodiment of a hybrid electrical vehicle that may employ the battery module of the present invention.

Regardless of the particular configuration employed, the battery module may be employed in a wide variety of vehicles, such as an electric vehicle (EV), a hybrid electric vehicle (HEV), a plug-in hybrid electric vehicle (PHEV), or other type of vehicle using electric power for propulsion (collectively referred to as "electric vehicles"). The vehicle may be in the form of an automobile, bus, truck, motorcycle, boat, etc. Referring to FIG. 1, for instance, one embodiment of a suitable vehicle 10 is shown in the form of an automobile (e.g., car) having a battery system 20 for providing all or a portion of the motive power for the vehicle 10. Although the battery system 20 is illustrated in FIG. 1 as being positioned in the trunk or rear of the vehicle, according to other exemplary embodiments, the location of the battery module 20 may differ. For example, the position of the battery module 20 may be selected based on the available space within a vehicle, the desired weight balance of the vehicle, the location of other components used with the module 20 (e.g., battery management systems, vents, or cooling devices, etc.), and a variety of other considerations. FIG. 2 illustrates a cutaway schematic view of a particular vehicle 10A provided in the form of a hybrid electrical vehicle. In this embodiment, a battery module 20A is provided toward the rear of the vehicle 10A proximate a fuel tank 12. Of course, the battery module 20A may also may be provided immediately adjacent the fuel tank 12 or may be provided in a separate compartment in the rear of the vehicle 10A (e.g., a trunk) or may be provided elsewhere in the vehicle 10A). An internal combustion engine 14 may be provided when the vehicle 10A also employs gasoline power to help propel the vehicle 10A. An electric motor 16, a power split device 17, and a generator 18 are also provided as part of the vehicle drive system. Such a vehicle 10A may be powered or driven by just the battery module 20A, by just the engine 14, or by both the battery module 20A and the engine 14. It should be noted that other types of vehicles and configurations for the vehicle drive system may be used according to other exemplary embodiments, and that the schematic illustration of FIG. 2 should not be considered to limit the scope of the subject matter described in the present application.

The present invention may be better understood with reference to the following examples.

Test Methods

Melting Temperature:

The melting temperature ("Tm") may be determined by differential scanning calorimetry ("DSC") as is known in the art. The melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Tensile Modulus, Tensile Stress, and Tensile Elongation at Break:

Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus and Flexural Stress:

Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength:

Notched Charpy properties may be tested according to ISO Test No. ISO 179-1:2010 (technically equivalent to ASTM D256-10, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Deflection Temperature Under Load ("DTUL"):

The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Example

Sample 1 is formed from 16 wt. % FORTRON® 0203 (linear PPS), 13 wt. % RYTON® P25 (branched PPS), 1 wt. % FORTRON 1100 (linear PPS), 2 wt. % carbon black, 50 wt. % glass fibers, and 18 wt. % mica.

Sample 2 is formed from 33.62 wt. % FORTRON® 0203 (linear PPS), 1 wt. % black pigment, 45 wt. % glass fibers, 5 wt. % flake graphite (3715 RF174, Asbury), 0.08 wt. % of 3-aminopropyltriethoxysilane, 15 wt. % calcium carbonate, and 0.3 wt. % of a lubricant (Glycolube P).

Samples 1 and tested for thermal and mechanical properties, the results of which are provided in the table below.

|  | Sample 1 | Sample 2 |
| --- | --- | --- |
| Thermal Conductivity (in plane) (W/mK) | 0.7 | 1.8 |
| DTUL (1.8 MPa) (° C.) | 260 | 275 |
| Charpy Notched (kJ/m$^2$) | 3.5 | 6.5 |
| Tensile Strength (MPa) | 125 | 126 |
| Tensile Modulus (MPa) | 16,000 | 20,716 |
| Tensile Elongation at Break (%) | 0.8 | 0.8 |
| Flexural Strength (MPa) | 190 | 204 |
| Flexural Modulus (MPa) | 18,000 | 20,709 |
| Flexural Elongation (%) | — | 1.1 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A battery module comprising a polymer composition, wherein the battery module contains at least one electrochemical cell positioned within a housing, and wherein the polymer composition comprises a polyarylene sulfide, a thermally conductive particulate material, an inorganic particulate material, and an electrically insulative fibrous filler, wherein polyarylene sulfides constitute from 15 wt. % to 60 wt. % of the composition and 70 wt, % or more of polyarylene sulfides employed in the composition are linear polyarylene sulfides and the fibrous filler constitutes from 50 to 180 parts by weight per 100 parts by weight of polyarylene sulfides employed in the composition, and wherein the polymer composition exhibits a Charpy notched impact strength of 4 kJ/m$^2$ or more as measured at a temperature of 23° C. according to ISO Test No. 179-1:2010 and an in-plane thermal conductivity of 0.7 W/m–K or more as determined in accordance with ASTM E 1461-13.

2. The battery module of claim 1, wherein the housing contains the polymer composition.

3. The battery module of claim 1, wherein the battery module contains multiple electrochemical cells.

4. The battery module of claim 3, wherein the housing contains external walls that define a compartment within which the electrochemical cell is received.

5. The battery module of claim 3, wherein the external walls contain the polymer composition.

6. The battery module of claim 4, wherein the housing contains an interior wall for isolating individual electrochemical cells.

7. The battery module of claim 6, wherein the interior wall contains the polymer composition.

8. The battery module of claim 4, wherein the housing contains a cover that closes the compartment.

9. The battery module of claim 8, wherein the cover contains the polymer composition.

10. The battery module of claim 1, wherein the electrochemical cell contains a lithium-ion battery.

11. The battery module of claim 1, further comprising a frame to which the housing is connected.

12. The battery module of claim 11, wherein the frame contains the polymer composition.

13. A vehicle comprising the battery module of claim 1.

14. The vehicle of claim 13, wherein the vehicle is an electric vehicle, hybrid electric vehicle, or plug-in hybrid electric vehicle.

15. The battery module of claim 1, wherein the polymer composition exhibits a tensile modulus of 15,000 MPa or more as determined in accordance with ISO Test No. 527:2012 at a temperature of 23° C.

16. The battery module of claim 1, wherein the thermally conductive particulate material constitutes from 5 to 50 parts by weight of the composition per 100 parts by weight of polyarylene sulfides in the composition.

17. The battery module of claim 1, wherein the inorganic particulate filler constitutes from 30 to 70 parts by weight of the composition per 100 parts by weight of polyarylene sulfides employed in the composition.

18. The battery module of claim 1, wherein the thermally conductive particulate material has an intrinsic thermal conductivity of 50 W/m–K or more.

19. The battery module of claim 1, wherein the thermally conductive particulate material includes graphite.

20. The battery module of claim 1, wherein the thermally conductive particulate material is in the form of flakes.

21. The battery module of claim 1, wherein the fibrous filler includes glass fibers.

22. The battery module of claim 1, wherein the inorganic particulate material contains particles having an aspect ratio of 0.6 to 2.0.

23. The battery module of claim 1, wherein the inorganic particulate material contains calcium carbonate particles.

24. The battery module of claim 1, wherein the composition further comprises an organosilane compound.

25. The battery module of claim 1, wherein the polymer composition exhibits a Charpy notched impact strength of 5 kJ/m$^2$ or more as measured at a temperature of 23° C. according to ISO Test No. 179-1:2010.

26. The battery module of claim 1, wherein the polymer composition exhibits a tensile modulus of from 17,000 MPa to 50,000 MPa as determined in accordance with ISO Test No. 527:2012 at a temperature of 23° C.

27. The battery module of claim 1, wherein the polymer composition exhibits a flexural modulus of from 15,000 MPa to 30,000 MPa as determined in accordance with ISO Test No. 178:2010 at 23° C.

28. The battery module of claim 1, wherein the polymer composition exhibits an in-plane thermal conductivity of 1 W/m–K or more as determined in accordance with ASTM E 1461-13.

29. The battery module of claim 1, wherein from 80 wt. % to 100 wt. % of polyarylene sulfides employed in the composition are linear polyarylene sulfides.

* * * * *